United States Patent [19]

Grunewalder

[11] 4,360,385
[45] Nov. 23, 1982

[54] WATER REPELLENT COMPOSITIONS FOR THE TREATMENT OF WOOD

[75] Inventor: John F. Grunewalder, Glenshaw, Pa.
[73] Assignee: PPG Industries, Inc., Pittsburgh, Pa.
[21] Appl. No.: 224,429
[22] Filed: Jan. 12, 1981
[51] Int. Cl.³ .......................... C09K 3/18; C09D 5/14
[52] U.S. Cl. .................................... 106/2; 106/18.29; 106/18.32; 106/18.33; 106/18.35; 106/271; 106/285; 524/490
[58] Field of Search ................. 106/18.29, 18.36, 271, 106/285, 18.32, 18.33, 18.35, 2; 260/22 CB; 524/490

[56] References Cited

U.S. PATENT DOCUMENTS 3,236,679  2/1979  Spiller et al. ........................ 117/93.4

OTHER PUBLICATIONS

Gulftene Alpha Olefin Data—Product Information Sheet No. AO-20-24-877 st—Publication data prior to Jan. 12, 1981.
Gulf Petrochemical Products—Publication date prior to Jan. 12, 1981.

Primary Examiner—Lorenzo B. Hayes
Attorney, Agent, or Firm—Charles R. Wilson

[57] ABSTRACT

Water repellent treating compositions are based upon olefin and paraffin materials containing a substantial proportion of compounds containing from 20 to 24 carbon atoms. The treating compositions are especially useful for application to wood. Additives such as wood preservatives, alkyd resins and, in especially preferred compositions, organic ionizable compounds are included. The preferred compositions are useful for application to wood substrates which are subsequently electrostatically sprayed with a topcoating.

13 Claims, No Drawings

WATER REPELLENT COMPOSITIONS FOR THE TREATMENT OF WOOD

BACKGROUND OF THE INVENTION

The subject invention relates to water-repellent compositions. More particularly, the invention relates to water-repellent compositions and methods whereby wood is treated with the compositions so as to obtain water-repellency and optionally wood preservacy and/or conductivity.

There has long been a need for water-repellent compositions. Such compositions find use on a variety of substrates. One area in particular where water-repellents have found use has been in the treatment of wood. This is especially true for wood which is exposed to the outside environment and which conventionally is not provided with the protection offered by paint. For example, certain portions of wood windows do not get painted. Such portions when continually contacted with water and subjected to changing weather conditions will swell, crack, and eventually rot. Generally, wood which is intended for exposure to the outdoors is treated prior to installation. Thus, wood which is to be used in a window frame is conventionally given a treatment with a water-repellent- and wood preservative-containing composition. After this treatment, the wood substrate is coated or strained for appearance purposes and an added measure of protection.

In some methods of wood treating, the treated and dried wood is further treated with a conductive solution and thereafter given a topcoat with electrostatic spray equipment. The advantage of the electrostatic spray operation is that the wood substrate is more evenly and completely topcoated. An obvious saving of time and expense would be if the wood could be given one treatment with a composition containing a water-repellent, wood preservative and conductor. The application of such a composition followed by an electrostatic spray step has definite time-saving and expense advantages. However, it has been found that the compounds effective as conductors when used with conventional wood treating water-repellents tend to adversely affect the water-repellency of the treated wood. This is true whether the conductors and water-repellents are mixed together prior to application to the wood or are applied separately.

There is a need in the wood coating art for compositions which are capable of providing a wood substrate with good water-repellency, especially at low cost. A special need is for compositions which are capable of providing a wood substrate with water-repellency and, at the same time, impart a conductive charge to the substrate such that a topcoat can thereafter be electrostatically spray applied. There has now been found compositions which are capable of providing the above advantages.

As used herein, all percents and ratios are by weight unless otherwise indicated.

SUMMARY OF THE INVENTION

Water-repellent treating compositions consist essentially of, (a) from about 1% to about 50% of an alpha olefin having from 20 to 24 carbon atoms, an alpha olefin blend, a paraffin blend, or a mixture thereof wherein at least about 50% of said olefin blend or paraffin blend consists essentially of compounds having from 20 carbon atoms to 24 carbon atoms, (b) at least about 0.5% of a material selected from the group consisting of:
  (i) from about 0% to about 6% of a wood preservative,
  (ii) from about 0% to about 20% of an alkyd resin,
  (iii) from about 0% to about 5% of an organic ionizable compound; and
  (iv) mixtures thereof; and (c) from about 45% to about 98% of an organic solvent.

Compositions used in a method of treating wood consist essentially of from about 1% to about 50% of the alpha olefin, alpha olefin blend or paraffin blend described above, organic solvent, and optionally, wood preservative, alkyd resin and/or organic ionizable compound.

The treating compositions described in the previous paragraph are especially useful for application to wood so as to provide the wood with water-repellency, said compositions having at least about 40% efficiency as measured by NWMA-M-2-70. The wood treating method comprises the steps of applying to the wood the aforedescribed water-repellent composition and thereafter drying the wood. An optional step includes the application of a topcoat by electrostatic spray means.

DETAILED DESCRIPTION OF THE INVENTION

The water-repellent treating compositions of this invention are more fully described in the following paragraphs. Methods of using the compositions are also described.

Water-repellent treating compositions of this invention contain as a water-repellent an alpha olefin having 20 to 24 carbon atoms, alpha olefin blend, paraffin blend, or a mixture thereof with the alpha olefin blend being preferred. The individual cuts of alpha olefin having 20 to 24 carbon atoms are useful, though such cuts are not readily available and are generally less preferred for this reason. Surprisingly, however, the paraffin material can only be used as a blend of compounds as described below, it being found the individual paraffins do not provide the desired water-repellency results. The olefin and paraffin blends are characterized by consisting essentially of a narrow range of carbon compounds. That is, while paraffins are well known and have been used extensively heretofore, such materials are blends of a wide range of different carbon chain length materials. These commonly used paraffin blends are difficult to paint over and do not provide the good water-repellency efficiencies of the olefin and paraffin compounds described herein. It has now been found that narrow cuts of olefin and/or paraffin provide surprisingly good results in terms of the water-repellency they are able to impart to wood. At least about 50% of the olefin blend or paraffin blend consists essentially of compounds having from 20 carbon atoms to 24 carbon atoms. Preferably, the olefin blend and paraffin blend contain at least about 70% and, more preferably, at least about 90% of the compounds having between 20 and 24 carbon atoms. The most preferred blend contains at least about 96% of the compounds having 20 to 24 carbon atoms and less than about 3% of the compounds having less than 20 carbon atoms and less than about 1% having more than 24 carbon atoms.

Treating compositions used in the methods of this invention consist essentially of from about 1% to about 50%, preferably from about 1% to about 15% of the above described olefin or paraffin material, optional additives, and from about 45% to about 98%, preferably from about 70% to about 95% of a suitable solvent. Higher levels of the olefin or paraffin in the compositions can be used but are generally avoided due to the fact higher levels do not provide additional benefits and are difficult to apply. Many different organic solvents are suitable, examples of which include hydrocarbons and halogenated hydrocarbons such as toluene, xylene, mineral spirits, n-hexane, cyclohexane, chlorobenzene and perchloroethylene. The optional additives mentioned above are selected from the group consisting of wood preservatives, alkyd resins, organic ionizable compounds and mixtures thereof, all of which are further described in the following paragraphs.

The above discussed treating compositions are further characterized by their ability to provide wood with water-repellency at a level such that the compositions are at least about 40%, preferably at least about 50%, and more preferably at least about 60% efficient as determined by the N.W.M.A. Swellometer test. The test is described in detail in a publication identified as NWMA-M-2-70, published by National Woodwork Manufacturers Association and is incorporated herein by reference. The test is performed using kiln-dried Ponderosa Pine sapwood cut to give specimens ¼ inch in longitudinal dimension, 1½ inch in radial dimension and 10 inches in tangential dimension. The wood specimens are conditioned, immersed for 30 seconds in the wood treating composition and again conditioned. Swelling of untreated specimens is compared with swelling of the treated specimens after each have been immersed in water. A Swellometer is used for measuring the respective swellings. The difference between the swelling of the treated and untreated specimens divided by the swelling of the untreated specimen times 100 gives the percentage figure mentioned above. The above water-repellency values are substantially retained for a sustained period thereby indicating the long-term effectiveness of the compositions of this invention. It is theorized the olefins and paraffins of this invention are able to penetrate into the substrates and thereby provide the above levels of water-repellency efficiency.

Other additives when included in the treating compositions include wood preservatives, alkyd resins (generally providing additional water-repellency and paint hold-out) and/or organic ionizable compound conductors and represent at least about 0.5% of the compositions. These components are used to provide their known functions. Any combination of them can be used together with the olefin or paraffin water-repellents. Thus, there is used in the compositions, (a) from about 1% to about 50%, preferably from about 1% to about 15% of the above described alpha olefin, alpha olefin blend, paraffin blend or mixture thereof;

(b) at least about 0.5% of a material selected from the group consisting of:

(i) from about 0% to about 6%, preferably from 0.5% to about 6%, of a wood preservative, (ii) from about 0% to about 20% preferably from about 1% to about 20%, of an alkyd resin, and (iii) from about 0% to about 5%, preferably from about 1% to about 5%, more preferably from about 1% to about 2% of an organic ionizable compound, and mixtures thereof; and (c) from about 45% to about 98%, more preferably from about 70% to about 95% of the organic solvent.

Many known compounds are useful as wood preservatives and can be used herein. Examples of such materials include organic tin compounds, e.g. triphenyl and tributyl tin oxide, chlorinated compounds, e.g. tri-, tetra- and pentachlorophenol, mono- and dichloro naphthalenes, organic mercury compounds, e.g. phenyl mercury acetate and oleate, and metal naphthenates, e.g. zinc and copper naphthenates.

Alkyd resins have conventionally been used in wood treating compositions to provide a degree of water-repellency and to aid paint holdout. Such resins are polyesters of polyhydroxyl alcohols and polycarboxyl acids chemically combined with various drying, semi-drying and nondrying oils in different proportions. Thus, for example, the alkyd resins are made from polycarboxylic acids such as phthalic acid, maleic acid, fumaric acid, isophthalic acid, succinic acid, adipic acid, azelaic acid, sebacic acid as well as from anhydrides of such acids, where they exit. The polyhydric alcohols which are reacted with the polycarboxylic acid include glycerol, trimethylolethane, trimethylolpropane, pentaerythritol, sorbitol, mannitol, ethylene glycol, diethylene glycol and 2,3-butylene glycol. The alkyd resins are produced by reacting the polycarboxylic acid and the polyhydric alcohol together with a drying, semi-drying or non-drying oil in proportions depending upon the properties desired. The oils are coupled into the resin molecule by esterification during the manufacturing and become an integral part of the polymer. The oil is fully saturated or predominately unsaturated. The fully saturated oils tend to give a plasticizing effect to the alkyd, whereas the predominately unsaturated oils tend to crosslink and dry rapidly with oxidation to give more tough and durable alkyd resins. Suitable oils include coconut oil, fish oil, linseed oil, tung oil, castor oil, cottonseed oil, safflower oil, soybean oil, and tall oil. Various proportions of the polycarboxylic acid, polyhydric alcohol and oil are used to obtain alkyd resins of various properties.

Organic ionizable compounds have been used for treating nonconductive surfaces such as wood so as to provide the substrate with a conductive surface. Such materials are used prior to the application of a topcoat by electrostatic spray means. Thus, the ionizable compounds provide a conductive surface to the substrate which is thereafter followed by spraying electrostatically charged coating particles having an opposite charge. This method of topcoat application is particularly desirable since very uniform and complete application of a topcoat can be achieved. Examples of conventionally used and suitable organic ionizable compounds include organic acids, bases and salts, with the organic ion formed by ionization having either a positive or negative charge. Preferred are salts which provide positively charge ions, in particular the quaternary and diquarternary ammonium halides and sulfates having a carbon to nitrogen ratio of from about 10:1 to about 30:1. It is particularly preferred to have present in either the quaternary or diquarternary ammonium compound a single substituent having a long carbon chain, desirably a carbon chain containing from 10–22 carbon atoms. The preferred substituents are alkyl groups which are essentially lacking in carbon to carbon unsaturation and these are preferably straight chain groups, though branched chain groups can be tolerated, especially when the extent of branching is relatively small. Aromatic hydrocarbon substituents are not preferred, but can be tolerated.

Thus, particularly preferred quaternary halide salts are quaternary ammonium chlorides having a carbon to nitrogen ratio of from about 10:1 to about 30:1 and having a structural formula selected from the group consisting of:

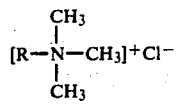

and

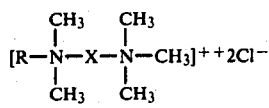

in which R is a hydrocarbon substituent containing from 10-22 carbon atoms, preferably an alkyl substituent, and X is a divalent hydrocarbon chain containing from 1 to 10 carbon atoms, preferably a divalent alkylene radical illustrated by the radical:

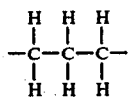

Specific illustrations of ionizable organic compounds which are used in accordance with the invention are as follows:

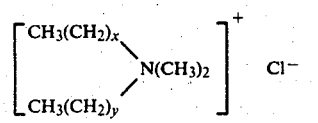

where x and y are 7, 9, 11, 13, 15, or 17;
[CH$_3$(CH$_2$)$_{15}$—N(CH$_3$)$_3$]$^+$Cl$^-$;
[tallow—N(CH$_3$)$_2$(CH$_2$)$_3$N(CH$_3$)$_3$]$^{++}$2Cl$^-$;
[(coco-)$_2$N(CH$_3$)$_2$]$^+$Cl$^-$;
[CH$_3$(CH$_2$)$_{15}$N(CH$_3$)$_3$]$^+$Cl$^-$;
[CH$_3$(CH$_2$)$_{17}$N(CH$_3$)$_3$]$^+$Cl$^-$;
[CH$_3$(CH$_2$)$_7$CH=CH(CH$_2$)$_8$N(CH$_3$)$_3$]$^+$Cl$^-$;
[coco-N(CH$_3$)$_3$]$^+$Cl$^-$;
[CH$_3$(CH$_2$)$_4$CH=CHCH$_2$CH=CH(CH$_2$)$_8$N(CH$_3$)$_3$]$^+$Cl$^-$;
[CH$_3$(CH$_2$)$_7$CH=CH(CH$_2$)$_8$N(CH$_3$)$_3$]$^+$Cl$^-$;
[CH$_3$(CH$_2$)$_{13}$N(CH$_3$)$_3$]$^+$Cl$^-$;
[tallow—N(CH$_3$)$_3$]$^+$Cl$^-$;
[CH$_3$(CH$_2$)$_{11}$N(CH$_3$)$_3$]$^+$Cl$^-$;
[coco-N(CH$_3$)$_2$N(CH$_3$)$_3$]$^{++}$2Cl$^-$

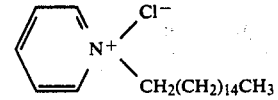

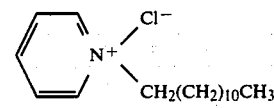

The terms coco and tallow in the above formulas indicate the hydrocarbon radicals derivable from the corresponding oil or fat.

Quaternary ammonium hydroxides and sulfates corresponding to the above illustrated compounds are also useful, with tetra alkyl ammonium etha sulfate being preferred.

Ionizable organic compounds which ionize to form negatively charged organic ions can also be used for certain subtrates. Organic hydrocarbon substituted acids such as alkyl and aryl esters of acids of phosphorus and sulfur are examples of these compounds. Specific examples of such compounds include ethyl acid phosphate, butyl acid phosphate, aryl acid phosphate, phenyl acid phosphate, p-toluene phosphonic acid, diethyl diphosphonate, p-toluene sulfonic acid and p-toluene sulfonyl chloride.

Other conventional additives can be included in the composition of this invention. For example, surfactants, pigments, etc. can be used in minor portions, i.e. less than about 5% of the total composition.

Compositions of this invention are especially useful when used for treating wood. The compositions can be applied by any conventional method including flow coating, roll coating, brushing, and spraying. Generally the amount of treating composition applied is sufficient to provide the wood with the desired water-repellency. The wood, after being treated, is optionally further coated and then dried at a temperature ranging from about 5° C. to about 65° C. The additional coating can be with any conventional topcoat desired. In the preferred method of this invention, the topcoat is a coating composition having a charge opoosite from that imparted to the substrate and is electrostatically applied. U.S. Pat. No. 4,009,307 describes a number of suitable polyurea-polyurethane topcoats which can be used in this invention (the disclosure of this patent is incorporated herein by reference).

EXAMPLE I

The following treating composition is formulated:

|  | % |
|---|---|
| Alpha olefin (1) | 1.7 |
| Tributyl tin oxide | 0.7 |
| Alkyd resin (2) | 6.0 |
| Alkyl ammonium etha sulfate (3) | 1.5 |
| 1-methyl-2-pyrrolidinone | 6.0 |
| Toluene | 84.1 |

(1) The alpha olefin consists of 96% C$_{20-24}$ compounds, 3% compounds having less than 20 carbon atoms and 1% compounds having more than 24 carbon atoms.
(2) A dehydrated castor oil short oil alkyd.
(3) Available from Aceto Chemical Corp. as Catafor CA-80.

The above composition is flow coated onto wood. An amount sufficient to result in uniform covering is applied. The water-repellency efficiency of the composition after 4 days is 56.9% as measured by NWMA-M-2-70. After 4 weeks, the water-repellency efficiency is 65%.

A Ransburg paintability meter indicates the wood substrate has a sufficiently charged surface to allow for electrostatic application of a topcoat up to 15 minutes after treatment.

EXAMPLE II

The following treating composition is formulated:

|  | % |
|---|---|
| Alpha olefins (1) | 1.7 |
| Alkyd resin (1) | 6.0 |
| Tributyl tin oxide | 0.7 |

-continued

| | % |
|---|---|
| Toluene | 85.6 |
| 1-methyl-2-pyrrolidinone | 6.0 |

(1) As used in Example I.

The water-repellency efficiency of the above composition is 66.2%. Subsequent treatment of the wood with conductor solutions does not substantially affect the water-repellency value.

EXAMPLE III

This example illustrates how the water-repellency of a conventional water-repellent is adversely affected by a conductor whereas the water-repellents of this invention are not substantially affected. Comparisons were made (1) wherein the water-repellent is first mixed with a conductor and then the resultant composition applied to a wood substrate and (2) wherein the water-repellent is first applied to the wood substrate and then a conductor applied to the substrate. The results of the tests are tabulated below:

| | Water Repellency |
|---|---|
| Composition of Example I | 54.3% |
| Composition of Example I and aftertreatment with conductive solution (1) | 53.3% |
| Woodlife Milltreat type E(2) | 63.6% |
| Woodlife Milltreat type E(2) and aftertreatment with conductive solution (1) | 31.6% |
| Woodlife Milltreat type E(2) and organic ionizable compound solution (3), 20:1 by vol. | 20.5% |
| Woodlife Milltreat type E(2) and organic ionizable compound solution (4), 20:1 by vol. | 26.7% |

(1) Blend of LD naphtha and ECC-119C-75, organic ionizable compound solution (Electro Coat Corp.), 50:1 by vol.
(2) A mixture of pentachlorphenol and water-repellents, available from Roberts Consol. Ind.
(3) Available from Electro Cote Chem. Co., Inc. as ECC-119C-75.
(4) Available from Aceto Chem. Co. as Catafor CA80.

The above results show the compositions of this invention impart good water-repellency values when a conductor is mixed with the alpha olefin water-repellents and also when the conductor is applied in a subsequent step. The conventional water-repellent, i.e. the Milltreat E imparts good water-repellency when used alone, but is substantially affected when a conductor is used either in conjunction with it or applied in a subsequent step.

EXAMPLE IV

This example illustrates the effect varying levels of alpha olefins in the treating compositions have on the compositions' water-repellency efficiencies. The following compositions are formulated and applied to wood substrates:

| Composition (%) | A | B | C | D | E | F | G | H | I |
|---|---|---|---|---|---|---|---|---|---|
| Alpha olefin (1) | 2.5 | 5.0 | — | 1.0 | 1.5 | 2.0 | 2.5 | 3.0 | 10.0 |
| Tributyl tin oxide | 0.7 | 0.7 | 0.7 | 0.7 | 0.7 | 0.7 | 0.7 | 0.7 | 0.7 |
| Alkyd resin (1) | — | — | 5.0 | 5.0 | 5.0 | 5.0 | 5.0 | 5.0 | — |
| Toluene | 90.8 | 88.3 | 88.3 | 87.3 | 86.8 | 86.3 | 85.8 | 85.3 | 83.3 |
| 1-methyl-2-pyrrolidinone | 6.0 | 6.0 | 6.0 | 6.0 | 6.0 | 6.0 | 6.0 | 6.0 | 6.0 |

(1) As used in Example I.

The water-repellency efficiencies determined as in Example I are as follows:

| Composition | Water Repellency (%) |
|---|---|
| A | 67.1 |
| B | 72.1 |
| C | 8.2 |
| D | 45.0 |
| E | 57.0 |
| F | 61.0 |
| G | 60.0 |
| H | 64.0 |
| I | 75.4 |

EXAMPLE V

This example illustrates the use of a $C_{20}$ to $C_{24}$ paraffin blend as a water-repellent.

| Composition (%) | A | B |
|---|---|---|
| Paraffin (1) | 1.7 | 1.7 |
| Tributyl tin oxide | 0.7 | 0.7 |
| Alkyd resin (2) | 6.0 | 6.0 |
| Alkyl ammonium etha sulfate (2) | — | 1.5 |
| Toluene | 85.6 | 84.1 |
| 1-methyl-2-pyrrolidinone | 6.0 | 6.0 |

(1) A blend of 49% $C_{20}$ n-paraffin, 42% $C_{22}$ n-paraffin, 8% $C_{24}$ n-paraffin and 1% other chain length paraffins.
(2) As used in Example I.

When applied to a wood substrate and tested as in Example I, the water-repellency efficiencies of Compositions A and B are 68.9% and 50.2%, respectively.

EXAMPLE VI

This example illustrates the importance of using a $C_{20}$ to $C_{24}$ paraffin blend. The following compositions are made:

| Composition (%) | A | B | C | D | E | F | G | H | I |
|---|---|---|---|---|---|---|---|---|---|
| $C_{18}$ n-paraffin | — | — | — | — | 1.7 | — | — | — | — |
| $C_{20}$ n-paraffin | 5.0 | — | — | — | — | 1.7 | — | — | — |
| $C_{22}$ n-paraffin | — | 5.0 | — | — | — | — | 1.7 | — | — |
| $C_{24}$ n-paraffin | — | — | 5.0 | — | — | — | — | 1.7 | — |
| $C_{20-24}$ n-paraffin blend (1) | — | — | — | 5.0 | — | — | — | — | 1.7 |
| Tributyl tin oxide | 0.7 | 0.7 | 0.7 | 0.7 | 0.7 | 0.7 | 0.7 | 0.7 | 0.7 |
| Alkyd resin (2) | — | — | — | — | 6.0 | 6.0 | 6.0 | 6.0 | 6.0 |
| Alkyl ammonium etha | | | | | | | | | |

-continued

| Composition (%) | A | B | C | D | E | F | G | H | I |
|---|---|---|---|---|---|---|---|---|---|
| sulfate (2) | — | — | — | — | 1.5 | 1.5 | 1.5 | 1.5 | 1.5 |
| Toluene | 89.3 | 89.3 | 89.3 | 89.3 | 84.1 | 84.1 | 84.1 | 84.1 | 84.1 |
| 1-methyl-2-pyrrolidinone | 5.0 | 5.0 | 5.0 | 5.0 | 6.0 | 6.0 | 6.0 | 6.0 | 6.0 |
| Water-repellency (%) | 0.0 | 0.0 | 0.0 | 65.3 | 22.8 | 8.0 | 4.5 | 3.3 | 50.2 |

(1) As used in Example V.
(2) As used in Example I.

The water-repellency efficiencies are obtained in the manner described in Example I. The above results show that good water-repellency (with or without the presence of an organic ionizable compound) is obtained only when the paraffin blend is used.

EXAMPLE VII

This example illustrates the importance of chain length of olefins for water-repellency. The following compositions are formulated and tested for water-repellency efficiency in the manner set out in Example I.

| Compositon (%) | A | B | C |
|---|---|---|---|
| $C_{18}$ alpha olefin | 5.0 | — | — |
| $C_{20}$ alpha olefin | 0.0 | 5.0 | — |
| $C_{20-24}$ alpha olefin blend (1) | — | — | 5.0 |
| Tributyl tin oxide | 0.7 | 0.7 | 0.7 |
| Toluene | 89.3 | 89.3 | 89.3 |
| 1-methyl-2-pyrrolidinone | 5.0 | 5.0 | 5.0 |
| Water-repellency efficiency (%) | 1.0 | 54.1 | 64.4 |

The above examples all illustrate the use of olefins, olefin blends and paraffin blends to get good water-repellency efficiencies.

What is claimed is:

1. A treating composition, consisting essentially of:
   (a) from about 1% to about 50% of a water-repellent selected from the group consisting of an alpha olefin having from 20 to 24 carbon atoms, a narrow cut alpha olefin blend, a narrow cut paraffin blend and mixtures thereof, wherein said olefin blend and paraffin blend consists essentially of a mixture of compounds of which at least about 50% have from 20 carbon atoms to 24 carbon atoms;
   (b) at least about 0.5% of a material selected from the group consisting of
      (i) from about 0% to about 6% of a wood preservative;
      (ii) from about 0% to about 20% of an alkyd resin;
      (iii) from about 0% to about 5% of an organic ionizable compound selected from the group consisting of quaternary ammonium halides, sulfates and hydroxides and alkyl and aryl esters of phosphorus-containing and sulfur-containing acids; and
      (iv) mixtures thereof; and
   (c) from about 45% to about 98% of an organic solvent.

2. The treating composition of claim 1 wherein said material is the wood preservative and is present at a level of from about 0.5% to about 6%.

3. The treating composition of claim 1 wherein said material is the alkyd resin and is present at a level of from about 1% to about 20%.

4. The treating composition of claim 1 wherein said material is the organic ionizable compound and is present at a level of from about 1% to about 5%.

5. The treating composition of claims 1, 2, 3, or 4 wherein the water-repellent is the alpha olefin blend consisting essentially of at least about 70% of the compounds having 20 to 24 carbon atoms.

6. The treating composition of claim 5 wherein the water-repellent is the alpha olefin blend consisting essentially of at least about 90% of the compounds having 20 to 24 carbon atoms.

7. The treating composition of claim 6 wherein the alpha olefin blend consists essentially of at least about 96% of compounds having from 20 to 24 carbon atoms, less than about 3% of compounds with less than 20 carbon atoms and less than about 1% of compounds with more than 24 carbon atoms.

8. The treating composition of claim 7 wherein the organic ionizable compound is present at a level ranging from 1% to about 2%.

9. The treating composition of claim 8 wherein the organic ionizable compound is a quaternary ammonium sulfate.

10. The treating composition of claim 1 containing from about 1% to about 15% of the alpha olefin, alpha olefin blend or paraffin blend and further characterized in being capable of providing a wood substrate with water-repellency at a level of at least about 40% efficiency as determined by NWMA-M-2-70.

11. The treating composition of claim 10 capable of providing water-repellency at a level of at least about 50% efficiency.

12. The treating composition of claim 11 capable of providing water-repellency at a level of at least about 60% efficiency.

13. The treating composition of claims 1, 2, 3 or 4 wherein the water-repellent is the paraffin blend and said paraffin blend is further characterized as being comprised of n-paraffins.

* * * * *